United States Patent
Nishikawa et al.

(10) Patent No.: US 11,519,462 B2
(45) Date of Patent: Dec. 6, 2022

(54) CONSTANT VELOCITY UNIVERSAL JOINT AND CAGE THEREOF

(71) Applicant: NTN CORPORATION, Osaka (JP)

(72) Inventors: Tsubasa Nishikawa, Shizuoka (JP);
Masashi Funahashi, Shizuoka (JP);
Tomoshige Kobayashi, Shizuoka (JP);
Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 355 days.

(21) Appl. No.: 16/647,561

(22) PCT Filed: Sep. 20, 2018

(86) PCT No.: PCT/JP2018/034836
§ 371 (c)(1),
(2) Date: Mar. 16, 2020

(87) PCT Pub. No.: WO2019/059285
PCT Pub. Date: Mar. 28, 2019

(65) Prior Publication Data
US 2020/0277997 A1 Sep. 3, 2020

(30) Foreign Application Priority Data
Sep. 21, 2017 (JP) ............................. JP2017-181244

(51) Int. Cl.
*F16C 33/38* (2006.01)
*F16D 3/22* (2006.01)
(Continued)

(52) U.S. Cl.
CPC .............. *F16D 3/224* (2013.01); *F16C 19/16* (2013.01); *F16C 33/3887* (2013.01);
(Continued)

(58) Field of Classification Search
CPC .. F16C 19/16; F16C 33/3887; F16C 2202/04; F16C 2204/64; F16C 2240/60;
(Continued)

(56) References Cited

U.S. PATENT DOCUMENTS 7,025,684 B2 * 4/2006 Frana .................. F16D 3/224
464/145
9,816,565 B2 * 11/2017 Yoshida ............... F16D 3/227
(Continued)

FOREIGN PATENT DOCUMENTS

| EP | 2 320 103 | 5/2011 |
| JP | 2001-153148 | 6/2001 |

(Continued)

OTHER PUBLICATIONS

Extended European Search Report dated Oct. 5, 2020 in corresponding European Patent Application No. 18859816.3.
(Continued)

*Primary Examiner* — Phillip A Johnson
(74) *Attorney, Agent, or Firm* — Wenderoth, Lind & Ponack, LLP

(57) ABSTRACT

A constant velocity universal joint includes an inner ring and an outer ring. A cage is disposed between an outer spherical surface of the inner ring and an inner spherical surface of the outer ring, and has windows in which respective balls are received. The cage has ball contact surface areas with which the balls come into contact, and includes soft portions that are lower in hardness than the ball contact surface areas. The soft portions are formed by local heat treatment at portions of the windows that are kept out of contact with the balls or surface portions around the windows.

13 Claims, 9 Drawing Sheets

(51) Int. Cl.
*F16D 3/224* (2011.01)
*F16C 19/16* (2006.01)
*F16D 3/223* (2011.01)

(52) U.S. Cl.
CPC ...... *F16C 2202/04* (2013.01); *F16C 2204/64* (2013.01); *F16C 2240/60* (2013.01); *F16C 2361/41* (2013.01); *F16D 2003/22303* (2013.01); *F16D 2200/0021* (2013.01); *F16D 2300/10* (2013.01)

(58) Field of Classification Search
CPC ................ F16C 2361/41; F16D 3/224; F16D 2003/22303; F16D 2300/10
See application file for complete search history.

(56) References Cited

U.S. PATENT DOCUMENTS

| | | | |
|---|---|---|---|
| 2001/0002369 A1 | 5/2001 | Kobayashi et al. | |
| 2010/0242564 A1 | 9/2010 | Cremerius et al. | |
| 2011/0124420 A1* | 5/2011 | Ooba | F16D 3/2245 464/145 |

FOREIGN PATENT DOCUMENTS

| | | | | |
|---|---|---|---|---|
| JP | 2006-226412 | 8/2006 | | |
| JP | 2006258170 A | * | 9/2006 | ........... F16D 3/2237 |
| JP | 2007-255461 | 10/2007 | | |
| JP | 2010-043691 | 2/2010 | | |
| JP | 4708430 | 6/2011 | | |
| JP | 2020-79630 | 5/2020 | | |

OTHER PUBLICATIONS

Anonymous: "Hardness comparison—Wikipedia", May 26, 2017, XP055731884.

Translation of International Preliminary Report on Patentability dated Mar. 24, 2020 in International (PCT) Application No. PCT/JP2018/034836.

International Search Report dated Dec. 18, 2018 in International (PCT) Application No. PCT/JP2018/034836.

* cited by examiner

CONSTANT VELOCITY UNIVERSAL JOINT AND CAGE THEREOF

TECHNICAL FIELD

The present invention relates to a constant velocity universal joint, and a cage used therein.

BACKGROUND ART

Generally, constant velocity universal joints (also called "constant velocity joints") for transmitting rotary motion are connecting members used, e.g., for automotive wheels or connected portions of automotive axles, and capable of transmitting torque at a constant velocity even when their operating angle is changed.

The main structure of a typical constant velocity universal joint is now described with reference to FIGS. 1 and 2. It includes an inner ring 3 having an outer spherical surface 2 in which a plurality of guide grooves 1 are formed, and an outer ring 6 having an inner spherical surface 5 in which a plurality of guide grooves 4 are formed. A plurality of balls 7 are disposed each between a guide groove 1 of the inner ring 3 and a guide groove 4 of the outer ring 6 so as to transmit torque. A tubular cage 9 is disposed between the outer spherical surface 2 of the inner ring 3 and the inner spherical surface 5 of the outer ring 6, and retains the balls 7. When the angle between rotary shafts of the inner ring 3 and the outer ring 6 changes, the balls 7 move in the opposed guide grooves 1 and 4 while being retained therebetween, thereby making it possible to transmit rotary motion at a constant velocity.

The cage of such a constant velocity universal joint is a short cylindrical member made of e.g., low/medium carbon steel, and having a plurality of pockets (also called "windows") in which torque receiving balls are rollably received. The pockets are formed by punching so as to be disposed in the circumferential direction of the cage. In order to increase the strength of the cage, the cage is quenched and tempered after being carburized with gas, thereby making the entire surface of the cage as hard as possible, while providing ductility to the central portion of the cage.

Japanese Unexamined Patent Application Publication No. 2001-153148 discloses an improved technique for manufacturing a cage for a fixed type constant velocity universal joint in which after quenching the cage, circumferentially opposed end surfaces of the pockets are cut so that their harness is lower than that of axially opposed side surfaces of the pockets, thereby providing toughness to the pillars between the pockets, and thus increasing the tensile and torsional strengths of the pillars.

Japanese Unexamined Patent Application Publication No. 2006-226412 discloses a cage for a constant velocity universal joint made of a material quenched to be hardened in its entirety, in which shear surfaces are formed on axially opposed ball rolling surfaces (contact surfaces) of each pocket by pressing, and finished surfaces are further formed thereon by cutting after heat treatment, thereby increasing the strength of the cage.

Japanese Patent No. 4708430 discloses a cage for a constant velocity universal joint made of carbon steel having a carbon content of 0.3 to 0.5%, and having a hardness of 500 to 650 Hv by being quenched to be hardened in its entirety, and being tempered to have uniform ductility and hardness over its entire cross section.

A cage for a constant velocity universal joint is required to be high in toughness, while maintaining wear resistance by increasing the hardness of the ball contact surface areas of the cage, such that cracks are less likely to form in the surfaces of the pockets (windows) at peripheral edge portions thereof even when the cage is repeatedly deformed by distortion.

For the cage of Japanese Unexamined Patent Application Publication No. 2001-153148, while, after quenching the cage, the circumferentially opposed end surfaces of the pockets are cut so as to be lower in hardness than the axially opposed side surfaces of the pocket, since the peripheral edge portions of the pockets are hard portions made of steel of which the surface is carburized and quenched, it is impossible to prevent cracks.

For the cage of Japanese Unexamined Patent Application Publication No. 2006-226412, while the hardness of the entire cage is increased, and thus the cage has sufficient wear resistance, the cage does not have toughness at the surfaces of the peripheral edge portions of the pockets.

For the cage of Japanese Patent No. 4708430, which is made of carbon steel having a predetermined carbon content, and which has a hardness of 500 to 650 Hv by being quenched to be hardened in its entirety, and being tempered, cracks are less likely to form in the peripheral edge portions of the pockets, but the ball contact surface areas of the cage are low in hardness, so that the cage does not have sufficient wear resistance.

In a constant velocity universal joint, as its operating angle changes to a large degree, the loads (surface pressures) applied to the cage from the balls also change to a large degree. A constant velocity universal joint is required which operates properly without the above-mentioned problems even when its operating angle changes to a large degree.

SUMMARY OF THE INVENTION

It is an object of the present invention to ensure a predetermined strength in a cage for a constant velocity universal joint so as to overcome the above-described problem, i.e., prevent formation and development of cracks in the peripheral edge portions of the pockets, and also to ensure wear resistance in the ball contact surface areas of the cage. It is another object of the present invention to reduce the size and weight of a constant velocity universal joint, and also to ensure a predetermined strength in the constant velocity universal joint even when used at a large operating angle, by using the above-described cage, which is high in strength and durability.

In order to achieve the above object, the present invention provides a constant velocity universal joint comprising: an inner ring having an outer spherical surface in which a plurality of guide grooves are formed; an outer ring having an inner spherical surface in which a plurality of guide grooves are formed; a plurality of balls each disposed between one of the guide grooves of the inner ring and one of the guide grooves of the outer ring so as to transmit torque; and a cage disposed between the outer spherical surface of the inner ring and the inner spherical surface of the outer ring, and having windows in which the respective balls are received, wherein the cage is made of a steel material quenched to be hardened in an entirety of the steel material, and wherein the cage has ball contact surface areas with which the balls come into contact, and the cage includes soft portions that are lower in hardness than the ball contact surface areas, the soft portions being disposed at surface portions of the windows that are kept out of contact with the balls, or surface portions of the cage around the windows.

When torque is applied to the above-described constant velocity universal joint of the present invention, the balls come into contact with the guide grooves of the inner and outer rings, and forces axially moving the balls, i.e., forces axially pushing the cage are generated from the contact points. Since the cage is made of a steel material quenched to be hardened in its entirety, and thus has a sufficiently high hardness at its ball contact surface areas, the cage is capable of receiving the surface pressures from the balls while having sufficient wear resistance and mechanical strength.

At this time, the cage tends to be deformed by strain such as distortion, elongation and contraction at or around the windows, e.g., at peripheral edge portions of the windows. However, since the cage includes soft portions lower in hardness than the ball contact surface areas of the cage, and disposed on local areas of the windows such as their peripheral edge portions, the cage has sufficient toughness due to their ductility. Therefore, it is possible to prevent formation and development of cracks due to dynamic loads such as repeated loads.

In order to sufficiently ensure the above action, the soft portions preferably have a thickness of 0.05 mm or more.

In order to prevent cracks at the windows of the cage, e.g., at their peripheral edge portions while ensuring wear resistance of the cage, it is preferable that the ball contact surface areas have a hardness (Vickers hardness) of more than Hv 650, and that the soft portions have a hardness of Hv 650 or less.

In order to sufficiently ensure wear resistance of the cage at its ball contact surface areas, the cage is preferably made of a steel having a carbon content of 0.45% or more.

By using a cage having such a high strength, the constant velocity universal joint has a required strength, and thus is sufficiently durable even when used at a large operating angle. Also, since such a cage maintains substantially the same strength even if its wall thickness is reduced, it is possible to reduce the weight and size of the components of the constant velocity joint including the cage, and thus the entire constant velocity universal joint.

In order to effectively produce such a cage for a constant velocity universal joint, it is preferable to adopt the step of forming, by local heat treatment, soft portions lower in hardness than the ball contact surface areas e.g., on peripheral edge portions of the windows that are kept out of contact with the balls.

In order to effectively produce such a cage for a constant velocity universal joint, it is preferable to form soft portions in layers or in streaks by heat treatment comprising local heating and annealing.

The cage for the constant velocity universal joint according to the present invention includes soft portions lower in hardness than the ball contact surface areas of the cage, at portions of the windows that are kept out of contact with the balls, or around the window. Therefore, the cage is capable of receiving the surface pressures from the balls while having sufficient wear resistance, and has toughness due to the ductility of e.g., peripheral edge portions of the windows. As a result, it is possible to sufficiently prevent formation and development of cracks due to dynamic loads such as repeated loads.

For the constant velocity universal joint of the present invention, since it is possible to sufficiently ensure wear resistance of the cage, and also to sufficiently prevent formation and development of cracks in the surfaces of the peripheral edge portions of the windows that are kept out of contact with the balls. Therefore, it is possible to reduce the weight or size of the constant velocity universal joint by reducing the wall thickness of the cage having a high strength so as to reduce the weight of the cage. Also, it is possible to ensure a required strength in the constant velocity universal joint even when used at a large operating angle.

DETAILED DESCRIPTION OF THE INVENTION

Figure 1:
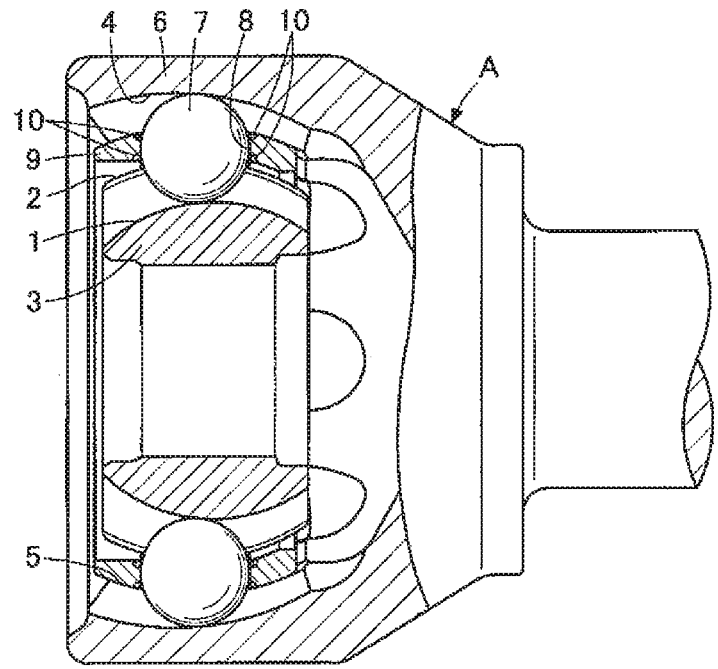
FIG. 1 is a partially cutaway front view of a constant velocity universal joint embodying the present invention.

The embodiments of the present invention are described below with reference to the attached drawings.

As illustrated in FIGS. 1 to 7B, the constant velocity universal joint A of the first embodiment is a fixed type constant velocity universal joint including an inner ring 3 having an outer spherical surface 2 in which a plurality of guide grooves 1 are formed, and an outer ring 6 having an inner spherical surface 5 in which a plurality of guide grooves 4 are formed. A plurality of balls 7 are each disposed between a guide groove 1 of the inner ring 3 and a guide groove 4 of the outer ring 6 so as to transmit torque. A tubular cage 9 is disposed between the outer spherical surface 2 of the inner ring 3 and the inner spherical surface 5 of the outer ring 6, and has windows 8 in which the respective balls 7 are received.

Each window 8 has peripheral edge portions that are kept out of contact with the ball 7, and one or each of the peripheral edge portions forms, partially or entirely, a soft portion 10 lower in hardness than ball contact surface areas of the cage 9 with which the balls 7 are brought into contact.

Figure 2:
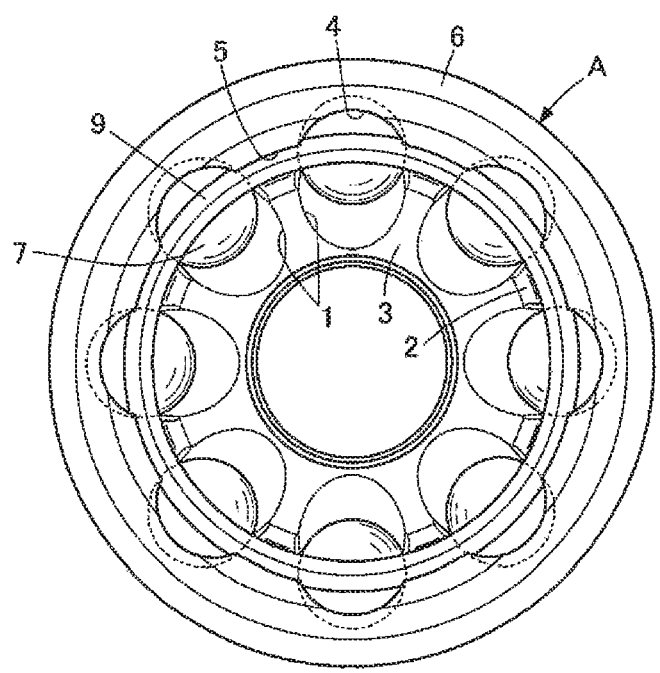
FIG. 2 is an end view on the open side of the outer ring of FIG. 1.

In the embodiments, as shown in FIGS. 1 and 2, the guide grooves 1 formed in the outer spherical surface 2 of the inner ring 3 consist of eight circular grooves equidistantly spaced apart from each other, and extending in the axial direction of the inner ring 3. The guide grooves 4 formed in the inner spherical surface 5 of the outer ring 6 also consist of eight circular grooves equidistantly spaced apart from each other, and extending in the axial direction of the outer ring 6. The number of the guide grooves 1, 4 of each of the inner and outer rings 3 and 6 may be altered according to the kind and intended use of the constant velocity universal joint. That is, any arbitrary number may be chosen besides ordinary six or eight.

Each (radially opposed) pair of guide grooves 1 and 4 of the inner and outer rings 3 and 6 constitute ball tracks between which one of the balls 7 (eight balls in the example shown) is disposed to transmit torque. The balls 7 are received in and rotatably retained by the respective (eight) windows 8 of the cage 9, which are equidistantly spaced apart from each other in the circumferential direction of the cage 9.

The constant velocity universal joint A operates with one of a driving rotary shaft and a driven rotary shaft coupled to the inner ring 3 and with the other rotary shaft coupled to the outer ring 6. The constant velocity universal joint A is configured such that, at any operating angle between the rotary shafts of the inner and outer rings 3 and 6, the balls 7 are positioned by the cage 9 such that the centers of the balls 7 lie on the plane bisecting the operating angle. At any operating angle, the balls 7 are fitted in both the guide grooves 1 of the inner ring 3 and the guide grooves 4 of the outer ring 6, and thus can transmit torque in either direction between the inner and outer rings 3 and 6.

Figure 3:
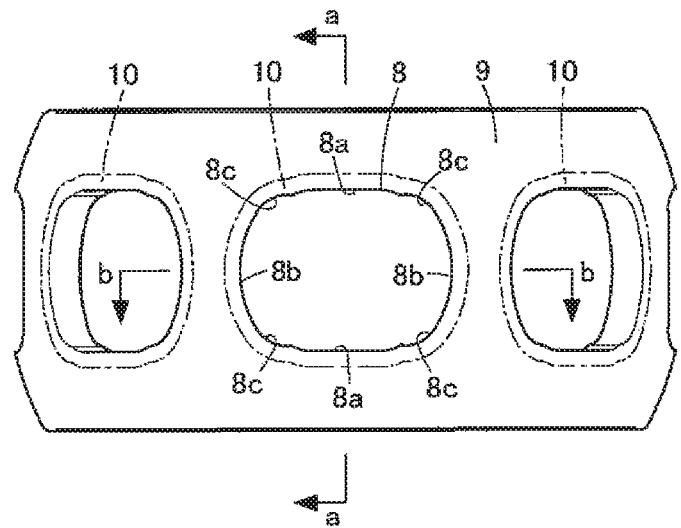
FIG. 3 is a front view of a cage according to a first embodiment of the present invention.

The tubular cage 9, which retains the balls 7, is made of a steel material quenched to be hardened in its entirety. As illustrated in FIGS. 1 to 3, of the inner peripheral surface of each window 8, the ball contact surface areas, which occupy most of the axially opposed end surfaces 8a of the window 8, is subjected to heat treatment to a required hardness to ensure wear resistance. For example, for sufficient wear resistance, the ball contact surface areas preferably have a hardness of more than Hv 650.

The ball contact surface areas of the cage 9 are composed of the following surface portions of the inner peripheral surface of each widow 8 (rectangular hole having rounded corners): strip-shaped portions of the axially opposed end surfaces 8a that occupy the middle sections (in the thickness (radial) direction of the cage 9) of the end surfaces 8a and extend in the circumferential direction of the cage 9. In other words, the ball non-contact surface areas, i.e., surface portions kept out of contact with the balls, of the cage 9, are composed of: (A) the following surface portions of the inner peripheral surface of each window 8: (i) inner and outer (in the radial direction of the cage 9) edge portions of the axially opposed end surfaces 8a; (ii) circumferentially opposed end surfaces 8b; and (iii) the four corners 8c, which are circular curved surfaces and defining the boundaries between the respective adjacent pairs of end surfaces 8a and 8b; and (B) the portions of the inner and outer peripheral surfaces of the cage 9 not including the inner peripheral surfaces of the windows 8.

As illustrated in FIG. 3, the constant velocity universal joint of the first embodiment includes a soft portion 10, i.e., a portion lower in hardness than the ball contact surface areas of the cage 9, that extends continuously around the entire circumference of one or each of peripheral edge portions of each window 8 that are kept out of contact with the balls 7.

In order to prevent formation and development of cracks, such soft portions 10 are preferably formed, using a known heat treatment composed of quenching and annealing, in layers, in a strip or strips, or in streaks so as to extend from one or each of the inner and outer peripheral surfaces of the cage 9, to a depth/thickness of 0.05 mm or more (e.g., 0.05 to 0.5 mm)

In FIG. 3, as described above, a soft portion 10 is formed continuously around the entire circumference of one or each of the peripheral edge portions of each window 8 that are kept out of contact with the ball 7. Such a soft portion 10 can be formed by annealing including the above locally heating step so as to be lower in hardness than the ball contact surface areas of the cage 9. Since such a soft portion 10 extends from one or each of the inner and outer peripheral surfaces of the cage 9, and has a thickness/depth of 0.05 mm or more from the inner peripheral surface of each window 8, such a soft portion appears on one or each of the inner and outer peripheral surfaces of the tubular cage, which are also not come into contact with the balls 7.

The positions of the soft portions 10 in the radial (thickness) direction of the cage 9 are preferably adjusted according to the kind and intended use of the constant velocity universal joint. For example, if the constant velocity universal joint is used on the front portion of a drive shaft of an automobile, since the operating angle of the constant velocity universal joint changes to a large degree, and the amount by which the balls move relative to the cage 9 is correspondingly large, the dimensional ranges of the soft portions 10 are preferably reduced.

In this case, it is preferable that the ball contact surface areas of the cage 9 have a hardness of more than Hv 650 in view of wear resistance, and that the soft portions 10 at the ball non-contact surface areas of the cage 9 have a hardness of Hv 650 or less in view of the strength of the cage 9.

If the constant velocity universal joint is used on an automotive propeller shaft, or the rear portion of an automotive drive shaft, since the operating angle of the constant velocity universal joint is relatively small, and the amount by which the balls move relative to the cage 9 is correspondingly small, the dimensional ranges of the soft portions 10 can be increased accordingly.

Figure 4A:
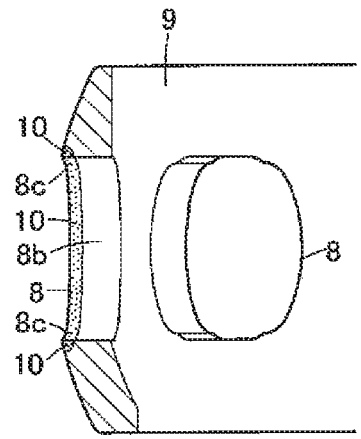
FIG. 4A is a sectional view taken along line a-a of FIG. 3, and showing soft portions at the radially outer side of the cage according to the first embodiment
Figure 4B:
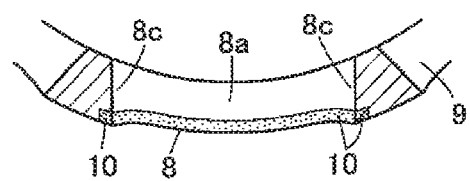
FIG. 4B is a sectional view taken along line b-b of FIG. 3, and showing soft portions on the radially outer side of the cage according to the first embodiment

In the example of FIGS. 4A and 4B, of the entire inner peripheral surface of each window 8, a soft portion 10 is formed only at the peripheral edge portion that connects to the outer peripheral surface of the cage 9, so that the radially central area and the area connecting to the inner peripheral surface of the cage 9 have a high hardness (Hv 650 or more).

Figure 5A:
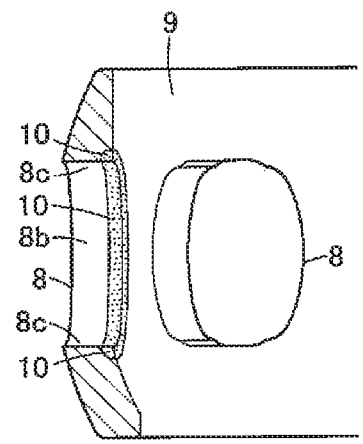
FIG. 5A is a sectional view taken along line a-a of FIG. 3, and showing soft portions on the radially inner side of the cage according to the first embodiment.
Figure 5B:
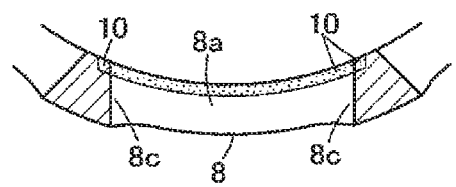
FIG. 5B is a sectional view taken along line b-b of FIG. 3, and showing soft portions on the radially inner side of the cage according to the first embodiment

In the example of FIGS. 5A and 5B, of the entire inner peripheral surface of each window 8, a soft portion 10 is formed only at the peripheral edge portion that connects to the inner peripheral surface of the cage 9, so that the radially central area and the area connecting to the outer peripheral surface of the cage 9 have a high hardness (Hv 650 or more).

Figure 6A:
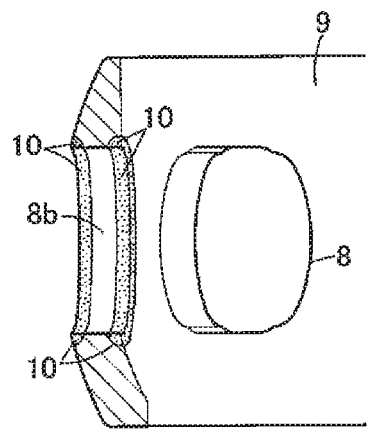
FIG. 6A is a sectional view taken along line a-a of FIG. 3, and showing soft portions on the radially inner and outer sides of the cage according to the first embodiment
Figure 6B:
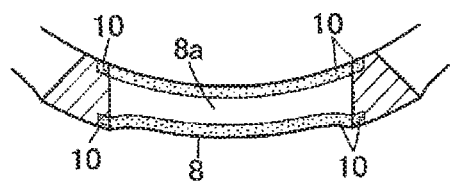
FIG. 6B is a sectional view taken along line b-b of FIG. 3, and showing soft portions on the radially inner and outer sides of the cage according to the first embodiment.

In the example of FIGS. 6A and 6B, of the entire inner peripheral surface of each window 8, soft portions 10 are formed at the peripheral edge portions connecting, respectively, to the inner and outer peripheral surfaces of the cage 9, so that only the radially central area has a high hardness (Hv 650 or more).

Figure 7A:
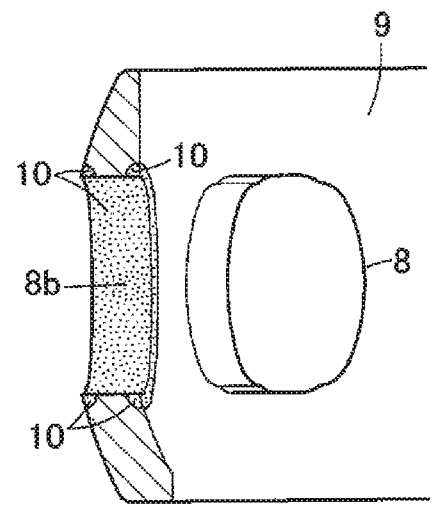
FIG. 7A is a sectional view taken along line a-a of FIG. 3, and showing soft portions on the radially entire areas of predetermined portions of the cage according to the first embodiment other than its ball contact area.
Figure 7B:
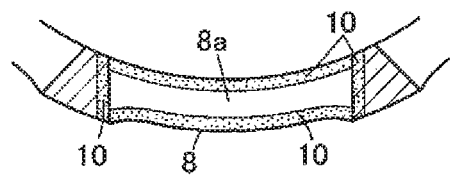
FIG. 7B is a sectional view taken along line b-b of FIG. 3, and showing soft portions on the radially entire areas of predetermined portions of the cage according to the first embodiment other than its ball contact area.

In the example of FIGS. 7A and 7B, of the entire inner peripheral surface of each window 8, soft portions 10 are formed over the entire areas that are kept out of contact with the ball 7 (the ball 7 is shown in FIG. 1), so that only the areas that are brought into contact with the ball 7 have a high hardness (Hv 650 or more).

In any of the above-described specific examples of the first embodiment, a soft portion 10, i.e., a surface portion lower in hardness than the ball contact surface areas of the cage 9, extends continuously around the entire circumference of one or each of the peripheral edge portions of each window 8. Therefore, regardless of the shape of the edges of the windows 8 of the cage 9, all of their edge portions are elastically deformable and ductile. This sufficiently prevents formation and development of cracks due to dynamic loads such as repeated loads during operation.

Next, in the second embodiment shown in FIGS. 8 to 10B, instead of forming a soft portion 10 continuously around the entire circumference of one or each of the peripheral edge portions of each window 8 as in the first embodiment, soft portions 10 are formed only at the four corners 8*c* of each window 8, which are circular curved surfaces and defining the boundaries between the respective adjacent pairs of end surfaces 8*a* and 8*b*. Otherwise, the soft portions 10 of the second embodiment are formed in the same manner as in the first embodiment.

Figure 8:
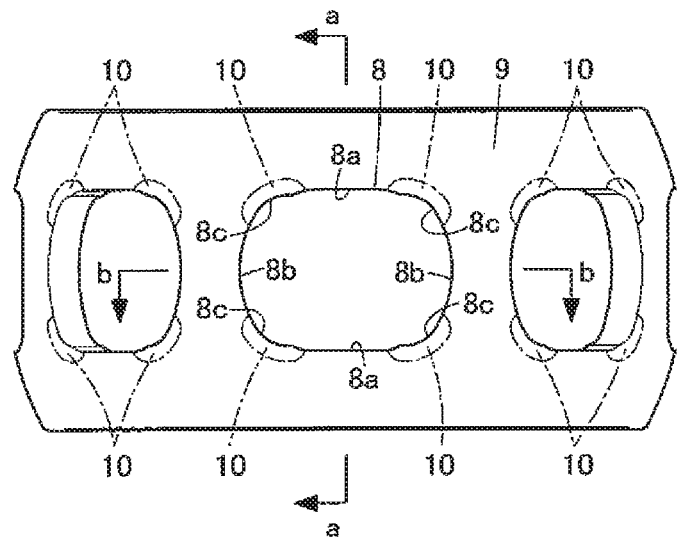
FIG. 8 is a front view of a cage according to a second embodiment of the present invention.
Figure 9A:
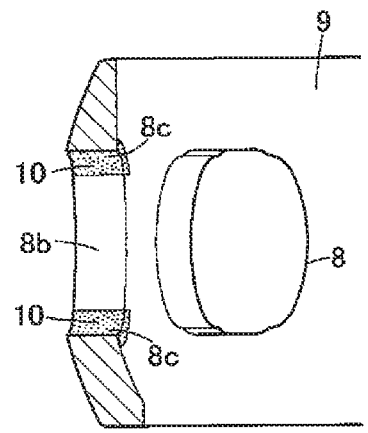
FIG. 9A is a sectional view taken along line a-a of FIG. 8, and showing soft portions on the radially entire areas of predetermined portions of the cage according the second embodiment
Figure 9B:
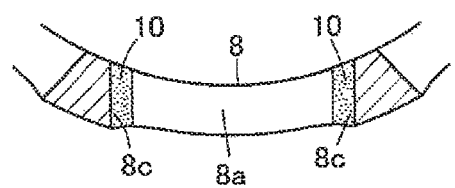
FIG. 9B is a sectional view taken along line b-b of FIG. 8, and showing soft portions on the radially entire areas of predetermined portions of the cage according the second embodiment.

In the second embodiment, too, as in the specific examples (shown in FIGS. 4A to 7B) of the first embodiment, the positions of the soft portions 10 in the radial (thickness) direction of the cage 9 may be changed according to the kind and intended use of the constant velocity universal joint For example, as illustrated in FIGS. 8, 9A and 9B, a soft portion 10 may be formed at each of the four rounded corners 8*c* of each (rectangular) window 8 so as to extend the entire length of the corner in the radial (thickness) direction of the cage 9. In this case, the cage 9 has a high hardness (Hv 650 or more) at the end surfaces 8*a* and 81 of the inner periphery of each window 8.

Figure 10A:
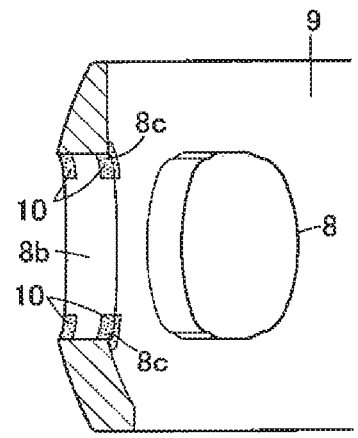
FIG. 10A is a sectional view taken along line a-a of FIG. 8, and showing soft portions on the sections of predetermined portions of the cage according the second embodiment on the radially inner and outer sides of the cage.
Figure 10B:
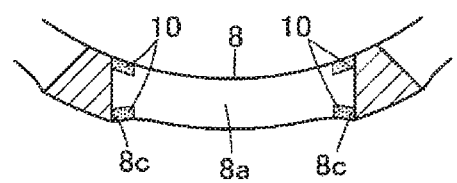
FIG. 10B is a sectional view taken along line b-b of FIG. 8, and showing soft portions on the sections of predetermined portions of the cage according the second embodiment on the radially inner and outer sides of the cage.

Alternatively, as illustrated in FIGS. 10A and 10B, each of the four corners 8*c* of each window 8 may have soft portions 10 only at its peripheral edge portions connecting, respectively, to the inner and outer peripheral surfaces of the cage 9. In this case, of the inner peripheral surface of each window 8 of the cage 9, the end surfaces 8*a* and 8*b* and the radially central areas of the four corners 8*c* have a high hardness (Hv 650 or more).

As still another example of the second embodiment, while not shown, the soft portions 10 of the second embodiment may be rearranged in view of (or in combination with) the arrangement of the soft portions 10 shown in FIGS. 4A and 4B or FIGS. 5A and 5B of the first embodiment.

Next, in the third embodiment shown in FIGS. 11 to 13B, instead of forming a soft portion 10 continuously around the entire circumference of one or each of the peripheral edge portions of each window 8 as in the first embodiment, a soft portion or portions 10 are formed in the combined area consisting of: (i) each of the circumferentially opposed end surfaces 8*b*; and (ii) the corners 8*c* formed by circular curved surfaces and defining the boundaries between the above end surface 8*b* and the respective axially opposed end surfaces 8*a* (this area is hereinafter referred to as "first combined area"). Otherwise, the soft portions 10 of the third embodiment are formed in the same manner as in the first embodiment.

Figure 11:
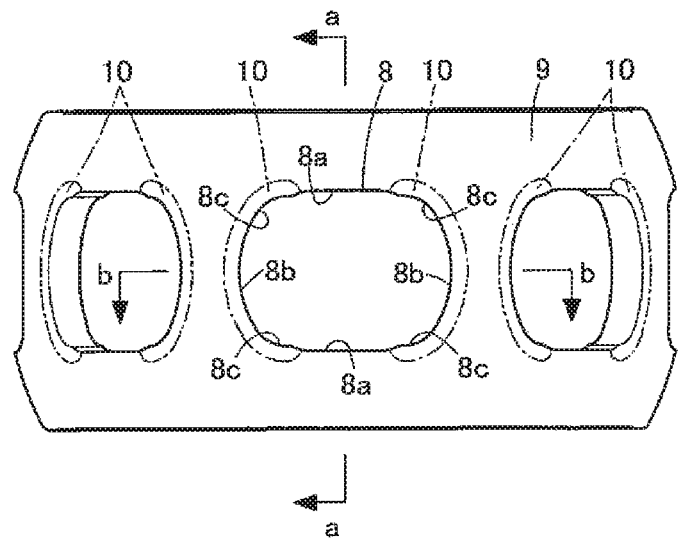
FIG. 11 is a front view of a cage according to a third embodiment of the present invention.
Figure 12A:
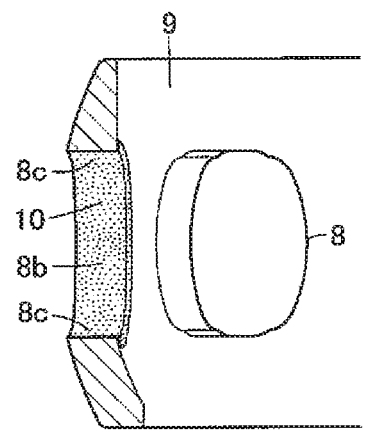
FIG. 12A is a sectional view taken along line a-a of FIG. 11, and showing soft portions on the radially entire areas of predetermined portions of the cage according the third embodiment.
Figure 12B:
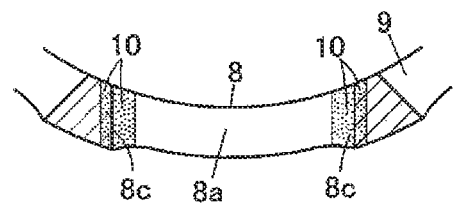
FIG. 12B is a sectional view taken along line b-b of FIG. 11, and showing soft portions on the radially entire areas of predetermined portions of the cage according the third embodiment.

In the third embodiment, too, as in the specific examples (shown in FIGS. 4A to 7B) of the first embodiment, the positions of the soft portions 10 in the radial (thickness) direction of the cage 9 may be changed according to the kind and intended use of the constant velocity universal joint For example, as illustrated in FIGS. 11, 12A and 12B, a soft portion 10 may be formed on the entirety of each first combined area in the radial (thickness) direction of the cage 9. In this case, the end surfaces 8*a* has a high hardness (Hv 650 or more).

Figure 13A:
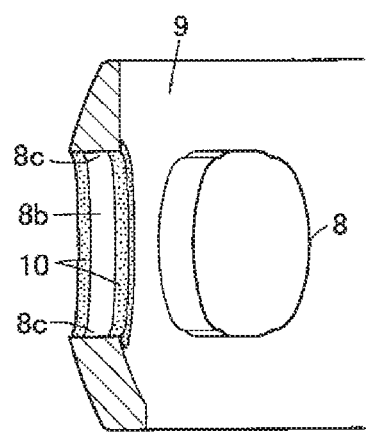
FIG. 13A is a sectional view taken along line a-a of FIG. 11, and showing soft portions on the sections of predetermined portions of the cage according the third embodiment on the radially inner and outer sides of the cage.
Figure 13B:
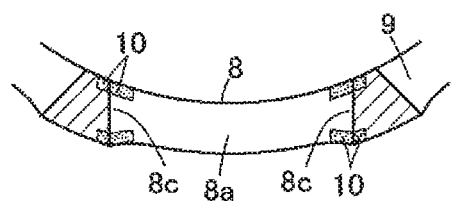
FIG. 13B is a sectional view taken along line b-b of FIG. 11, and showing soft portions on the sections of predetermined portions of the cage according the third embodiment on the radially inner and outer sides of the cage.

Also, as illustrated in FIGS. 13A and 13B, soft portions 10 may be formed only at edge portions of each first combined area that connect, respectively, to the inner and outer peripheral surfaces of the cage 9. In this case, of the inner periphery of each window 8 of the cage 9, the radially entire areas of the end surfaces 8*a* and the radially central portions of the first combined areas have a high hardness (Hv 650 or more).

As still another example of the third embodiment, while not shown, the soft portions 10 of the third embodiment may be rearranged in view of (or in combination with) the arrangement of the soft portions 10 shown in FIGS. 4A and 4B or FIGS. 5A and 5B of the first embodiment.

Figure 14:
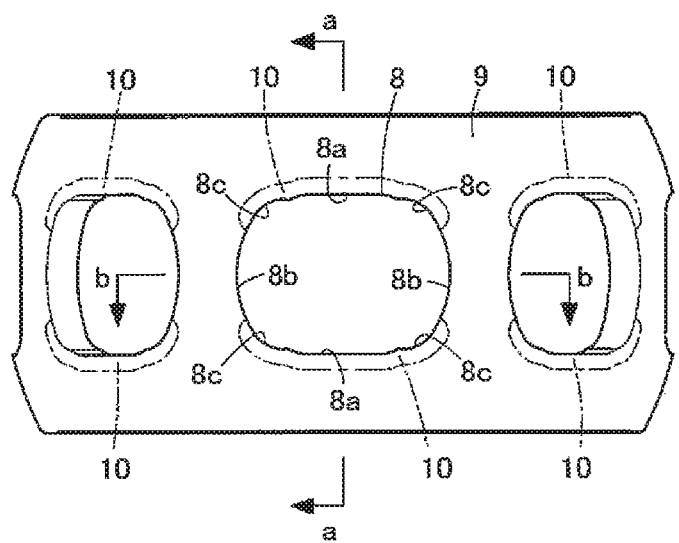
FIG. 14 is a front view of a cage according to a fourth embodiment of the present invention.
Figure 15A:
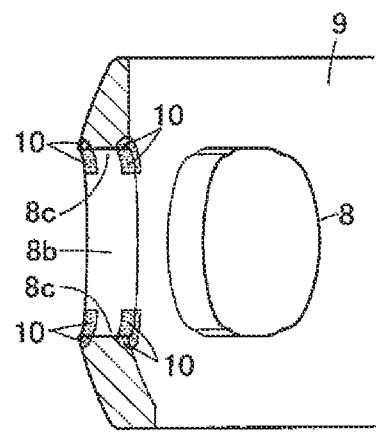
FIG. 15A is a sectional view taken along line a-a of FIG. 14, and showing soft portions on the sections of predetermined portions of the cage according the fourth embodiment on the radially inner and outer sides of the cage.
Figure 15B:
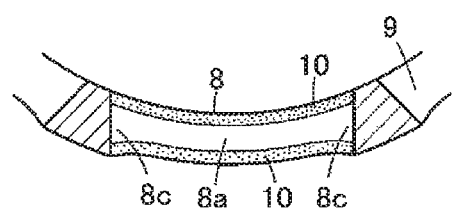
FIG. 15B is a sectional view taken along line b-b of FIG. 14, and showing soft portions on the sections of predetermined portions of the cage according the fourth embodiment on the radially inner and outer sides of the cage.

Next, in the fourth embodiment shown in FIGS. 14 to 15B, instead of forming a soft portion 10 continuously around the entire circumference of one or each of the peripheral edge portions of each window 8 as in the first embodiment, a soft portion or portions 10 are formed in the combined area consisting of: (i) each of the axially opposed end surfaces 8*a*; and (ii) the corners 8*c* between the above end surface 8*a* and the circumferentially opposed end surfaces 8*a* (this area is hereinafter referred to as "second combined area"). Otherwise, the soft portions 10 of the fourth embodiment are formed in the same manner as in the first embodiment.

In the fourth embodiment, too, as in the examples (shown in FIGS. 4A to 7B) of the first embodiment, the positions of the soft portions 10 in the radial (thickness) direction of the cage 9 may be changed according to the kind and intended use of the constant velocity universal joint.

Also, as illustrated in FIGS. 14 to 15B, soft portions 10 may be formed only at edge portions of each second combined areas that connect, respectively, to the inner and outer peripheral surfaces of the cage 9. In this case, of the inner peripheral surface of each window 8 of the cage 9, the radially entire areas of the end surfaces 8b and the radially central portions of the second combined areas have a high hardness (Hv 650 or more).

As another example of the fourth embodiment, while not shown, the soft portions 10 of the fourth embodiment may be rearranged in view of (or in combination with) the arrangement of the soft portions 10 shown in FIGS. 4A and 4B or FIGS. 5A and 5B of the first embodiment.

By altering, as necessary, the positions of soft portions 10 to portions of the cage 9 where cracks are likely to occur based on any one of the specific examples of the second to fourth embodiments, the windows 8 can have a required ductility at such portions, thus sufficiently preventing formation and development of cracks due to dynamic loads such as repeated loads. Also, the opposed end surfaces 8a of each window 8, which contact the ball 7, are capable of receiving the surface pressure of the ball 7 while having sufficient wear resistance. Also, it is possible to minimize the dimensional ranges of the soft portions 10, thereby reducing the cost for heat treatment.

DESCRIPTION OF REFERENCE NUMERALS

1, 4: guide groove
2: outer spherical surface
3: inner ring
5: inner spherical surface
6: outer ring
7: ball
8: window
8a, 8b: end surface
8c: corner
9: cage
10: soft portion
A: constant velocity universal joint

What is claimed is:

1. A constant velocity universal joint comprising:
   an inner ring having an outer spherical surface in which a plurality of guide grooves are formed;
   an outer ring having an inner spherical surface in which a plurality of guide grooves are formed;
   a plurality of balls each disposed between one of the guide grooves of the inner ring and one of the guide grooves of the outer ring so as to transmit torque; and
   a cage disposed between the outer spherical surface of the inner ring and the inner spherical surface of the outer ring, and having windows in which the respective balls are received,
   wherein the cage is made of a steel material quenched to be hardened in an entirety of the steel material, and
   wherein the cage has ball contact surface areas with which the balls come into contact, and the cage includes soft portions that are lower in hardness than the ball contact surface areas, the soft portions being disposed at surface portions of the windows that are kept out of contact with the balls, or surface portions of the cage around the windows.

2. The constant velocity universal joint according to claim 1, wherein the soft portions are disposed at peripheral edge portions of the windows.

3. The constant velocity universal joint according to claim 2, wherein the soft portions have a thickness of 0.05 mm or more.

4. The constant velocity universal joint according to claim 3, wherein the ball contact surface areas have a hardness of more than Hv 650, and the soft portions have a hardness of Hv 650 or less.

5. The constant velocity universal joint according to claim 4, wherein the cage is made of a steel having a carbon content of 0.45% or more.

6. The constant velocity universal joint according claim 2, wherein the ball contact surface areas have a hardness of more than Hv 650, and the soft portions have a hardness of Hv 650 or less.

7. The constant velocity universal joint according to claim 2, wherein the cage is made of a steel having a carbon content of 0.45% or more.

8. The constant velocity universal joint according to claim 1, wherein the soft portions have a thickness of 0.05 mm or more.

9. The constant velocity universal joint according to claim 8, wherein the ball contact surface areas have a hardness of more than Hv 650, and the soft portions have a hardness of Hv 650 or less.

10. The constant velocity universal joint according to claim 8, wherein the cage is made of a steel having a carbon content of 0.45% or more.

11. The constant velocity universal joint according to claim 1, wherein the ball contact surface areas have a hardness of more than Hv 650, and the soft portions have a hardness of Hv 650 or less.

12. The constant velocity universal joint according to claim 11, wherein the cage is made of a steel having a carbon content of 0.45% or more.

13. The constant velocity universal joint according to claim 1, wherein the cage is made of a steel having a carbon content of 0.45% or more.

* * * * *